INVENTOR
WILLIAM OWEN JONES

United States Patent Office 3,539,301
Patented Nov. 10, 1970

3,539,301
APPARATUS FOR DETERMINATION OF CONTAMINANTS IN A LIQUEFIED GAS
William Owen Jones, Morden, England, assignor to The British Oxygen Company Limited, a British company
Filed Nov. 24, 1967, Ser. No. 685,498
Claims priority, application Great Britain, Nov. 28, 1966, 53,086/66
Int. Cl. G01n 21/06, 31/00
U.S. Cl. 23—254       1 Claim

ABSTRACT OF THE DISCLOSURE

An apparatus for determining a contaminant in a liquefied gas comprising a tube containing an adsorbent material which selectively adsorbs the contaminant. Apparatus is applicable to determining an acetylene contaminant in liquid oxygen.

---

Figure 1:
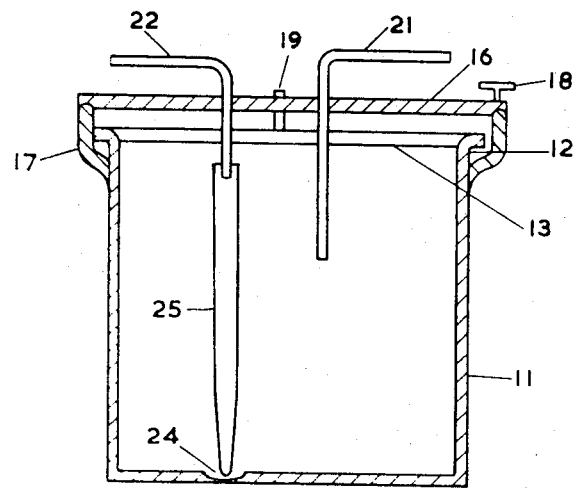

The present invention relates to a method and apparatus for determining the concentration of a contaminant in a liquefied gas. More particularly the invention relates to a method and apparatus for determining the concentration of a contaminant contained in a liquefied gas at subambient temperature which can be readily vaporised by heat inleak from the atmosphere.

A specific and nonlimiting use of the invention relates to the determination of the concentration of acetylene in liquid oxygen produced in conventional air separation processes where there is a risk that acetylene may accumulate in the liquid oxygen fraction. In order that timely action may be taken to prevent the acetylene content attaining a dangerous level it is routine practice to carry out determinations of the acetylene content of the liquid oxygen, particularly in parts of the air separation plant where the acetylene content of the liquid oxygen is most liable to build up. In carrying out such determination considerable difficulty has been experienced in obtaining an accurately measured volume of liquid oxygen ready for testing because the liquid oxygen evaporates so readily.

Furthermore the ingoing air to the plant may contain traces of ozone, which will tend to concentrate in the regions in which acetylene also builds up, so that the liquefied air or oxygen may become contaminated with both acetylene and ozone. The presence of ozone interferes with the determination of the acetylene content and renders analysis uncertain.

It is therefore an aim of the present invention to provide a method and apparatus for determining the concentration of contaminant in a liquefied gas which can be readily vaporised by heat inleak from the atmosphere.

According to the present invention there is provided a method for determining the concentration of contaminant in a liquefied gas comprising passing a predetermined volume of the liquefied gas through an adsorbent capable of adsorbing the contaminant from the liquefied gas, desorbing the contaminant therefrom and effecting a quantitative determination of the desorbed contaminant.

Preferably the desorbed contaminant is contacted with a reagent which undergoes a colour change proportional to the quantity of contaminant present. A stream of an inert gas such as nitrogen or argon may be used to transfer the desorbed contaminant to the reagent. It will be understood that the term "inert" means inert with respect to the reagent being used. In addition to the determination of the concentration of acetylene in liquid oxygen, the method may also be used, for example, to determine the concentration of acetylene contaminant in liquid nitrogen or liquid air, the concentration of carbon dioxide contaminant in liquid oxygen or liquid nitrogen or the concentration of mercaptan contaminant in a liquefied hydrocarbon.

The invention also provides a method for determining the concentration of a first contaminant in a liquefied gas containing a second contaminant, comprising passing a predetermined volume of the liquefied gas through an adsorbent capable of adsorbing the first contaminant and impregnated with a material capable of destroying the second contaminant, desorbing the first contaminant therefrom and effecting a quantitative determination of the desorbed first contaminant. The liquefied gas may be liqud oxygen or liquid nitrogen, and the first contaminant acetylene and the second contaminant ozone.

The quantitative determination may be carried out by contacting the desorbed first contaminant with a reagent which undergoes a colour change proportional to the quantity of contaminant present. A preferred adsorbent for acetylene is silica gel which readily adsorbs acetylene at liquid oxygen and liquid nitrogen temperatures and from which the acetylene may be desorbed by allowing the temperature of the adsorbent to rise to atmospheric temperature. The acetylene starts to be desorbed in very small quantities at —100° C. and the degree of desorption increases as the temperature rises above —100° C. Other suitable adsorbents are alumina or molecular sieves.

Preferred materials for destroying ozone are finely-divided palladium or platinum which catalyse the conversion of ozone to oxygen. Silica gel impregnated with palladium or platinum is available commercially as palladised or platinised silica gel, but it may also be prepared by impregnating the silica gel or other adsorbent with a solution of a palladium or platinum compound, and reducing the compound to liberate the free metal.

A preferred reagent for the acetylene determination is Ilovsay's reagent which is made by mixing an ammoniacal solution of a copper salt with a solution of hydroxylamine hydrochloride. This reagent detects the presence of acetylene by the formation of a red colour, the depth of the colour being proportional to the quantity of acetylene. A colorimeter may be used to indicate the colour produced as a direct reading of concentration.

The invention also provides apparatus for determining the concentration of contaminant in a liquefied gas which can be readily vaporised by heat inleak from the atmosphere comprising an open-ended vessel provided with a closure member and adapted to make a substantially gas tight seal over the open end of the vessel, a first tube extending through the closure member and adapted to contain adsorbent material capable of adsorbing the contaminant from the liquefied gas and a second tube extending through the closure member and adapted to allow liquefied gas to flow therethrough until a predetermined volume of liquefied gas is contained in the vessel.

Preferably the first tube extends through the closure member into the vessel so that the end of the tube inside the vessel is located near the bottom of the vessel. Such an arrangement enables substantially all the liquefied gas to be expelled through the first tube when the contaminant concentration determination is carried out.

Figure 2:
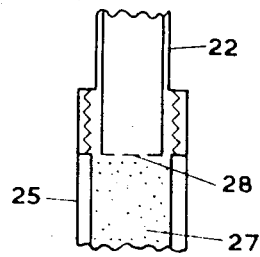

A specific method and apparatus for determining the concentration of contaminant in a liquefied gas will now be described, by way of example, and with reference to the accompanying drawings in which:

FIG. 1 is a sectional elevation of apparatus for determining the concentration of contaminant in a liquefied gas, and FIG. 2 is a sectional elevation of a part of the apparatus shown in FIG. 1.

The apparatus comprises a cylindrical vessel 11 having an annular rim 12 and a circular cover 13 which can be detachably mounted on the rim 12 to close the vessel 11. A gas-tight gasket (not shown) which is not attacked by the liquefied gas is located between the rim 12 and the cover 13 to provide a gas-tight seal therebetween. The cover 13 is locked onto the vessel 11 to provide a gas-tight closure by means of a clamping bar 16 pivotally mounted at 17 and arranged to be secured firmly in position by means of a wing nut 18. A screw 19 mounted on the clamping bar 16 enables additional pressure to be brought to bear on the cover 13 if so required.

Two open-ended tubes 21 and 22 extend through the cover 13, the tubes being positioned so that when the cover is clamped on the rim 12 the tubes are located on either side of the clamping bar 16. The tube 21 has its lower end located at the surface level of a predetermined measured volume in the vessel. The end of the tube 22 which is proximate to the underside of the cover 13 is screw threaded for connecting thereto a tube 25 containing adsorbent material 27 (see FIG. 2). A fine wire gauze screen 28 of stainless steel is interposed between the tubes 22 and 25 to prevent migration of the adsorbent material 27 from the tube 25 into the tube 22. The distal end of the tube 25 is tapered and extends into a recess 24 in the base of the vessel 11. The tube 21 has its lower end located at the surface level of a predetermined measured volume of liquefied gas so that when the vessel 11 is filled with liquefied gas excess liquefied gas will be expelled through the tube 21 until the surface level of the liquefied gas falls to the level of the lower end of the tube 21. At this point the vessel 11 is filled with the predetermined volume of liquefied gas.

The determination of the concentration of acetylene in liquid oxygen using this apparatus will now be described. The cover 13 is removed from the vessel 11 and the tube 25 filled with a sufficient quantity of silica gel adsorbent to adsorb all the acetylene contaminant likely to be found in the predetermined volume of liquid oxygen and screwed on to the tube 22. The vessel 11 is pre-cooled with liquid oxygen or any other suitable coolant and emptied of liquid. A quantity of liquid oxygen, in excess of the predetermined volume, is poured into the vessel 11 until the vessel is almost full whereupon the cover 13, carrying the adsorbent containing tube 25, is placed on the vessel 11. The clamping bar 16 is swung over the cover 13 and secured tightly in position by means of the wing nut 18. Heat inleak causes the pressure to rise in the vessel and liquid is expelled through the tube 21. Cessation of flow of liquid from the tube 21 indicates that the level of the liquid oxygen has fallen to the predetermined level and at this stage the outer end of this tube is closed by means of a plug or rubber bung.

Since the liquid oxygen can no longer escape through the tube 21, increase in pressure due to heat inleak forces the liquid oxygen through the tube 25 where the silica gel adsorbent adsorbs the acetylene contaminant. The provision of the recess 24 in the base of the vessel 11 enables the lower end of the tube 25 to remain submerged in liquid oxygen until substantially all the liquid oxygen has been removed from the vessel 11. The small portion of liquid remaining in the recess 24 gradually vaporises and the vapour leaves the vessel 11 by way of the tube 25.

The plug or rubber bung is now removed from the tube 21 and the apparatus allowed to warm up. As the temperature of the adsorbent rises above $-100°$ C. the acetylene starts to be desorbed and a slow stream of inert gas, which in this example is nitrogen, is passed into the tube 22 to blow the acetylene out of the silicia gel adsorbent through the vessel 11 and the tube 21 into a container charged with a suitable reagent for determining the quantity of acetylene. In this example Ilovsay's reagent is used. If desired the nitrogen can be passed in the opposite direction through the tube 21 and the vessel 11 to blow the acetylene out through the tube 22 but since most of the acetylene is adsorbed near the bottom of the tube 25 such a procedure involves passing the acetylene through the entire length of the silica gel adsorbent and consequently the desorption takes longer.

It will be appreciated that since the same silica gel adsorbent can be used repeatedly for a number of determinations the apparatus is ready for testing another predetermined volume of liquid oxygen immediately after the previous determination has been completed, without the need for carrying out any complicated adjustment or preparation of the apparatus. This feature makes the apparatus particularly suitable for periodic routine examination of the liquid oxygen product of an air separation plant.

If it is required to determine the concentration of a different contaminant in a liquefied gas it will be appreciated that the tube 25 may be refilled with a different adsorbent.

The apparatus may also be used to determine the acetylene concentration in liquid oxygen or liquid nitrogen which also contains ozone. In this case the tube 25 is packed with silica gel impregnated with palladium or platinum which catalyzes the conversion of the ozone into oxygen.

What I claim is:

1. Apparatus for determining the concentration of contaminant in a liquefied gas which can be readily vaporised by heat inleak from the atmosphere comprising an open-ended vessel provided with a closure member and adapted to make a substantially gas tight seal over the open end of the vessel, a first tube extending through the closure member into the vessel so that the end of the tube inside the vessel is located near the bottom of the vessel, said first tube being adapted to contain an adsorbent material capable of adsorbing the contaminant from the liquefied gas, and a second tube extending through the closure member adapted to allow liquefied gas to flow therethrough until a predetermined volume of liquefied gas is contained in the vessel.

References Cited

FOREIGN PATENTS 947,760 Germany.

OTHER REFERENCES

C.A. 53:6908, c–f (1959).
C.A. 53:19673, c–f (1959).

JOSEPH SCOVRONEK, Primary Examiner

S. MARANTZ, Assistant Examiner

U.S. Cl. X.R.

23—230, 232, 253